Jan. 30, 1962 K. F. KURZ 3,018,686
TACHISTOSCOPE
Filed Jan. 10, 1961 6 Sheets-Sheet 1

Fig.1

INVENTOR.
KARL KURZ
BY
BUCKHORN, CHEATHAM & BLORE
ATTORNEYS

Fig. 2

INVENTOR.
KARL KURZ
BY
BUCKHORN, CHEATHAM & BLORE
ATTORNEYS

Jan. 30, 1962 K. F. KURZ 3,018,686
TACHISTOSCOPE
Filed Jan. 10, 1961 6 Sheets-Sheet 5

INVENTOR.
KARL KURZ
BY
BUCKHORN, CHEATHAM & BLORE
ATTORNEYS

Jan. 30, 1962  K. F. KURZ  3,018,686
TACHISTOSCOPE
Filed Jan. 10, 1961  6 Sheets-Sheet 6

INVENTOR:
KARL KURZ
BY
BUCKHORN, CHEATHAM & BLORE
ATTORNEYS

United States Patent Office 3,018,686
Patented Jan. 30, 1962

3,018,686
TACHISTOSCOPE
Karl F. Kurz, Portland, Oreg., assignor to Sawyer's Inc., Progress, Oreg., a corporation of Oregon
Filed Jan. 10, 1961, Ser. No. 81,756
7 Claims. (Cl. 88—27)

The present invention comprises an improvement in tachistoscopes. The particular form of tachistoscope is one which is adapted to receive and rotatably guide a disc holding a concentric row of transparencies, disc feeding means movable from a rest position to an advanced position for rotating said disc one step during each such movement thereof whereby successively to place said transparencies at a projecting aperture, and means to return said feeding means to its rest position. Such a projector is disclosed and claimed in the patent to Smith No. 2,625,078, issued January 13, 1953, and the patent to Paulsohn No. 2,916,964, issued December 15, 1959, to which reference may be made for details which may not be completely apparent from the instant disclosure.

An object of the present invention is to provide means in a projector of the type described whereby the duration of projection of an image may be accurately and variably controlled, such means comprising a pair of shutters, shutter latching mechanism, and timing mechanism, such as disclosed and claimed in the patents to Smith No. 2,671,390, issued March 9, 1954, and No. 2,680,400, issued June 8, 1954, to which reference may be made for details which may not be completely disclosed in the instant application. By means of the improved apparatus herein disclosed, the time of exposure of an image may be set at any desired fractional part of a second, or may be manually controlled for longer exposures, such as two seconds or longer.

A further object of the present invention is to provide means in a device of the character described whereby a preselected portion of a transparency may be projected, or the entire transparency may be projected.

A further object of the present invention is to provide means in a device of the character described above whereby each transparency of a plurality of transparencies positioned in a concentric row upon a disc holder may be successively positioned in projecting position opposite a projecting aperture in the projector, such positioning being accomplished at each movement of a feeding mechanism from a rest position to an advanced position, in which the feeding mechanism may be rendered inoperative to advance the disc while actuating the shutter mechanism, so that a selected image may be repeatedly projected as desired.

The foregoing and other objects and advantages of the present invention will be readily apparent from inspection of the following specification taken in connection with the accompanying drawings wherein like numerals refer to like parts throughout, and in which a preferred form of the invention is illustrated and described.

Figure 1:
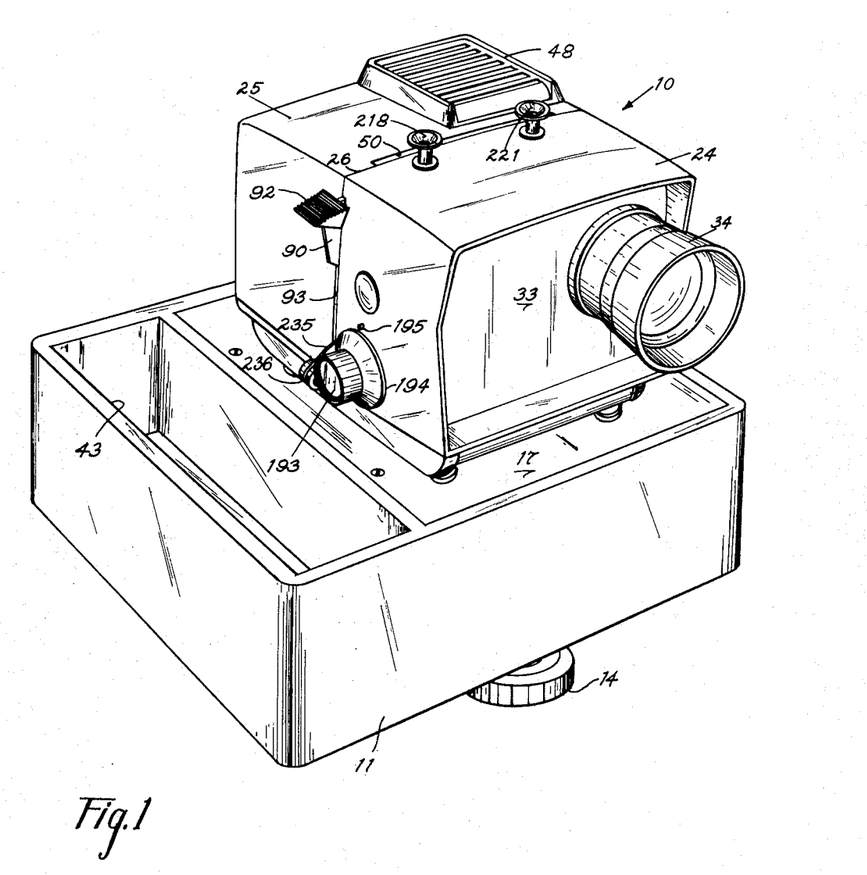
FIG. 1 is a view, in perspective, of the tachistoscope of the present invention mounted upon the base of a carrying case.
Figure 2:
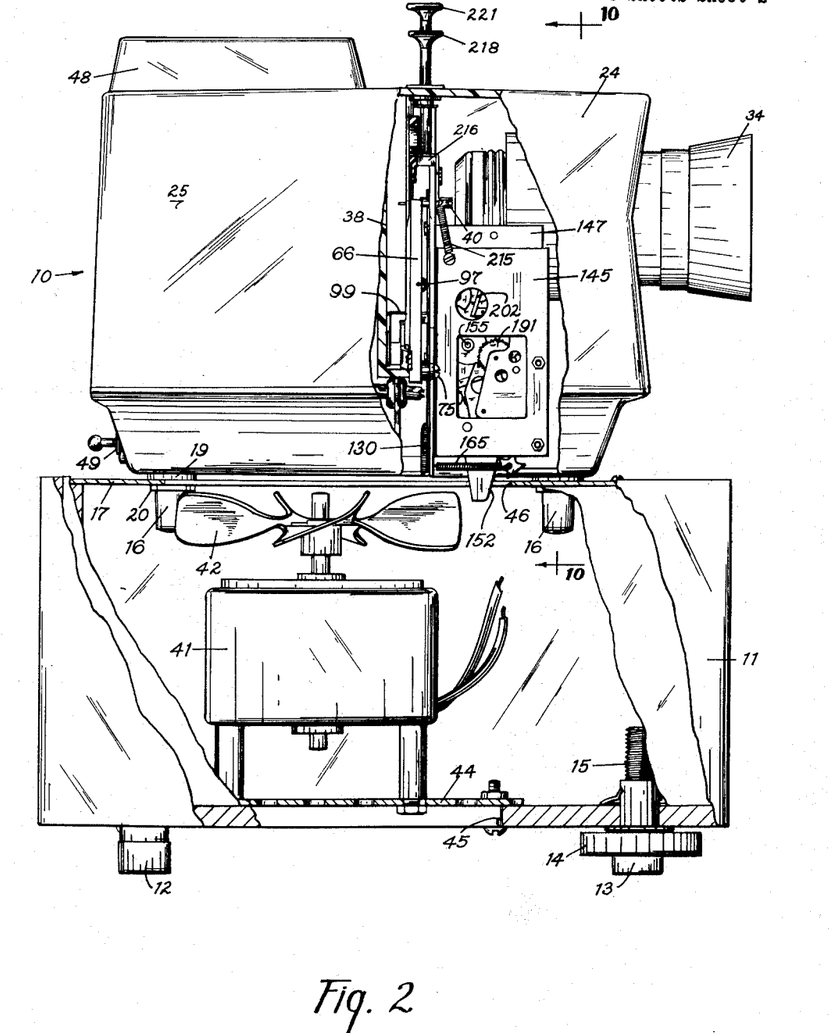
FIG. 2 is a view, in elevation, from the right side of FIG. 1, with parts broken away.
Figure 3:
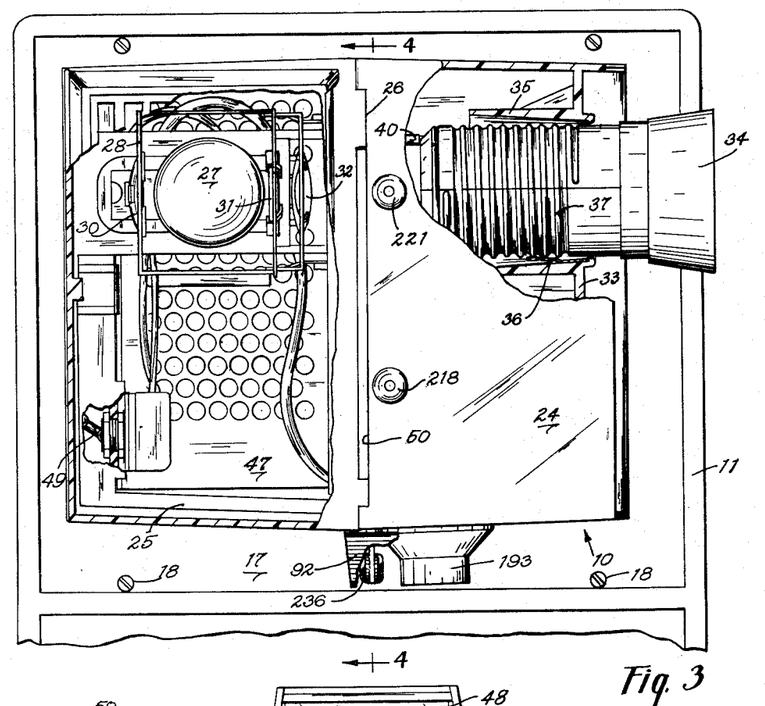
FIG. 3 is a partial plan view of FIG. 1 with parts broken away.

In FIGS. 1 to 3, inclusive, the over-all arrangement of the tachistoscope of the present invention may be seen. The tachistoscope comprises a projector generally indicated at 10, which is mounted upon a suitable base such as the lower portion 11 of a carrying case herein illustrated. The base is preferably provided with suitable feet 12 at the rear and a manually adjustable foot 13 at the front including a hand wheel 14 and a threaded stem 15 whereby the angular relationship of the base to any supporting surface may be vertically varied so as to shift the image created by the projector and cause it to fall upon any suitable screen. The projector is preferably provided with a plurality of tapered resilient feet 16 which project through suitable openings in a plate 17 mounted upon the base 11 by screws 18. Resilient washers 19 are positioned between the projector and the plate 17 and friction fit fasteners 20 are shoved up onto the tapered resilient feet 16 in order to hold the projector upon the base, the resilient feet and washers preventing transmission of motor hum from the base to the projector.

The projector comprises a pair of molded plastic housing parts, a forward part 24 and a rear part 25, the two fitting together along a transverse parting line 26 and being separately held together by suitable separable fastening means. A projecting lamp 27 is mounted in a louvered cage 28 in the rear housing part 25, the cage mounting a reflecting mirror 30 and suitable projecting lenses 31 and 32, the lamp, mirror and lenses being optically centered along the projecting axis of the projector. The forward housing part 24 includes a forward wall 33 in which there is mounted a focusing lens tube 34 positioned along the axis of projection. The focusing lens tube projects inwardly through a guiding flange 35 in which there is mounted a spring 36 having a detent which fits into a screw thread 37 on the surface of the tube.

Figure 4:
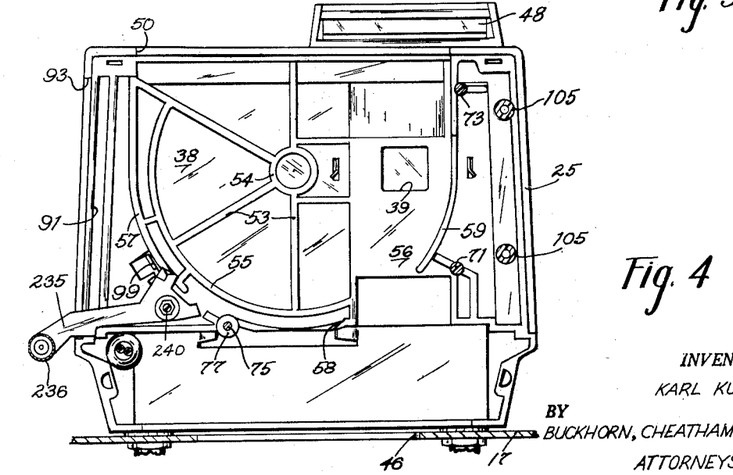
FIG. 4 is a partial vertical section taken substantially along line 4—4 of FIG. 3, with portions of the mechanism removed for clarity.
Figure 10:
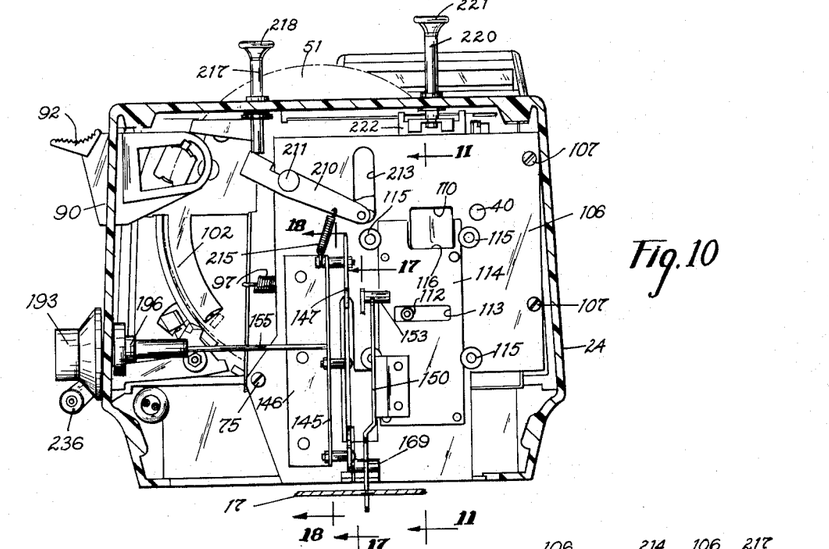
FIG. 10 is a view similar to FIG. 5, showing a shutter mechanism and portions of a timer mechanism mounted in position of use, the view being a vertical section taken substantially along line 10—10 of FIG. 2, with parts removed for clarity.

The construction is such that the tube may be rapidly moved longitudinally for large focusing adjustments, and rotated for fine focusing adjustments. The rear housing part 25 includes a forward wall 38 in which there is a projecting aperture 39 (FIG. 4) positioned along the projecting axis. An abutment 40 is provided to limit inward movement of tube 34 (FIGS. 3 and 10).

The lamp 27 is connected by suitable wires to a fan motor 41 which is mounted in the base and drives a fan 42. The base preferably includes a well 43 in which a cord and plug-in connector (not shown) may be coiled when not in use. The motor 41 is mounted upon an apertured plate 44 which is suitably mounted on the floor of the base over an air inlet opening 45. The plate 17 is provided with a large aperture 46 above the fan 42 and the lamp mounting cage 28 is mounted upon a perforated plate 47 spanning the bottom of the rear housing part 25, whereby air which is drawn through the opening 45 is projected into the rear housing part to cool the projecting mechanism and prevent overheating of transparencies being projected. The air leaves the housing through a louvered outlet 48 in the top of the housing part 25, the louvers preferably slanting forward so that hot air is blown away from the face of the person operating the projector. The lamp 27 and the motor 41 are suitably connected into a circuit including a switch 49.

Figures 5, 6, 7, 8, 9:
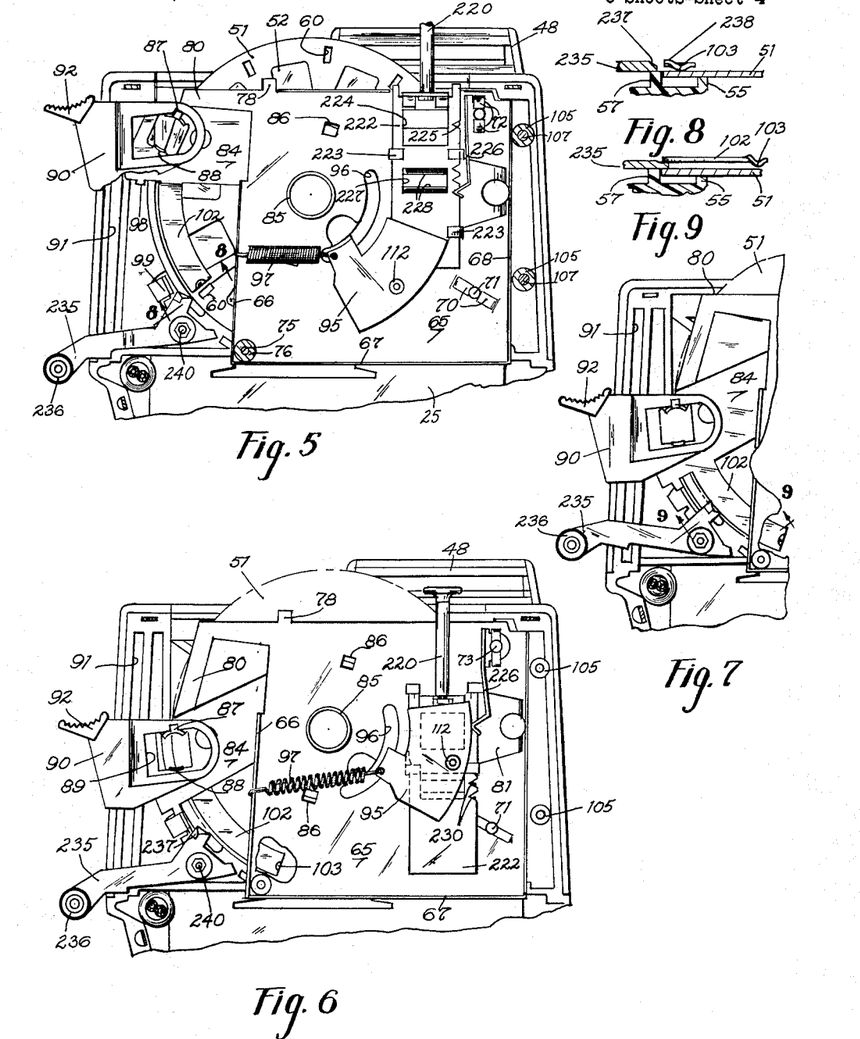
FIG. 5 is a view similar to FIG. 4, showing the disc feeding means mounted thereon and at its rest position, the view also showing a masking slide in one position of use.
FIG. 6 is a view similar to FIG. 5 showing the disc feeding means in its advanced position and the masking slide in another position of use.
FIG. 7 is a partial view similar to FIG. 6, showing the operation of means for rendering the advancing mechanism ineffective to advance the disc.
FIG. 8 is a partial section taken substantially along line 8—8 of FIG. 5.
FIG. 9 is a partial section taken substantially along line 9—9 of FIG. 7.

The upper forward edge of the rear housing part is recessed along the parting line 26 to provide a wide transverse slot 50 in the top of the projector through which a disc 51 mounting a concentric row of transparencies 52 may be inserted and removed. As seen in FIGS. 5 and 6, the upper edge of the disc projects above the housing so that it may be grasped for removal. The forward wall 38 of the rear housing part 25 is provided with a plurality of raised ribs, such as radial ribs 53 (FIG. 4), a circular inner rib 54 and a concentric outer rib 55, the forward surfaces of which lie in a common plane, also in which plane there is located a raised flat area 56, so that the rear surface of the disc, which is pressed in engagement therewith by means to be described, is maintained in a plane at right angles to the axis of projection. The wall 38 is also provided with ribs 57, 58 and 59 which define a pocket having a semicircular bottom, and an upper mouth coextensive with the slot 50, the forward surfaces of these ribs being advanced from the plane previously described so as to engage the edge of the inserted disc. The ribs, in combination with resilient means (to be described) which press the disc against the ribs defining said plane, comprise means for maintaining the disc in a projecting plane, and for guiding the same for rotation about the center of the disc. The disc 51 is provided with a concentric row of radially etxending, elongated apertures 60 adjacent the edge thereof, there being one aperture for each transparency. The apertures are equidistantly spaced, as are the transparencies, and so spaced that a definite angular advance at each step-by-step movement of the disc will position one of the transparencies in register with the projecting aperture 39. The aperture 39 is laterally spaced from the center of the disc.

Disc feeding means

A mounting structure is mounted within the forward housing part 24, said structure including a disc feeding means mounting plate 65 having suitable stiffening flanges 66, 67 and 68 along certain edges thereof (FIG. 5). The plate is apertured and slit to provide pairs of tabs 70 and 72 which grip posts 71 and 73, respectively, integral with wall 38. Another corner of plate 65 is retained against a pad 77 by a screw 75 and spacer 76, and the upper edge of the plate is retained by a tab 78 fitting a housing slot (not shown). Portions of the plate 65 provide resilient means for pressing the disc 51 against the ribs 53, 55 and surface 56, as follows: A locating dog arm 80 extends from the upper left corner of plate 65 laterally and then downwardly and is provided with a detent (not shown) which engages the apertures 60 releasably to hold the transparencies in alignment with the projecting aperture. At the other side of plate 65 there is provided a resilient, inwardly bent aperture framing tab 81 which presses the disc against the surface 56 around the projecting aperture.

A disc feeding lever 84 is rotatably mounted on the feeding mechanism mounting plate 65 as follows: The lever 84 is provided with a forwardly projecting cylindrical flange 85 which is journaled in a snugly fitting opening in the plate 65. A portion of the lever has arcuate edges, concentric with the flange 85, which are guided and retained by a pair of tabs 86 struck inwardly from the plate 65. The outer end of the lever 84 is provided with an upwardly facing tab 87 and a downwardly facing tab 88 which respectively engage the upper and lower horizontal edges of a large opening 89 in a disc feeding slide 90. The slide is provided with a vertical flange (not shown) which is guided in a groove 91 molded into the forward wall of the rear housing part 24. A fluted, upwardly facing thumb tab 92 is provided on a portion of the slide which projects laterally from the housing through a slot 93 along the parting line 26.

An opposite extension 95 of the lever 84, comprising a projecting aperture masking flag, projects through a concentric arcuate slot 96 in the plate 65, the extension 95 having a narrow neck which is bent forwardly and then laterally for this purpose. A spring 97 is tensioned between the extension 95 and the flange 66 of the mounting plate whereby the disc feeding mechanism is normally maintained in the position of rest illustrated in FIG. 5. Depression of the slide 90 results in partial rotation of the disc feeding lever, and when the slide is released the spring 97 returns the disc feeding lever and the slide to their positions of rest. The lever is thereby manually movable from a rest position to an advanced position, as illustrated in FIG. 6, and automatically returned when released. The lever 84 is provided with a stop 98 which engages an abutment 99, fixed to the forward wall of the rear housing part (FIG. 2), whereby the extent of feeding movement is limited.

The feeding lever 84 is provided with a concentric, resilient, downwardly projecting feeding finger 102 which is provided at its forward end with a feeding claw 103 adapted to engage each of the apertures 60 of the disc successively to effect the step-by-step feeding movement thereof. Upon the return movement of the feeding lever to its position of rest the dog arm 80 prevents the feeding finger from moving the disc in the reverse direction. During each advancing movement of the disc the extension 95 of the feeding lever obscures the projection aperture so as to eliminate any possibility of eyestrain due to shifting images on the screen.

Shutter mechanism

Figure 11:
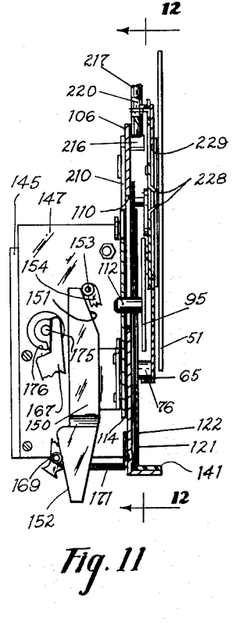
FIG. 11 is a partial vertical section taken substantially along line 11—11 of FIG. 10.

The mounting structure includes a pair of posts 105 projecting integrally forward from the wall 38 and provided with central, threaded bores. The posts project forward to the same extent as the spacer 76 (FIG. 5) and define therewith a plane in which is positioned a second vertical plate 106 of the mounting structure. The screw 75 and a pair of screws 107 engaging the posts 105 retain the mounting plate 106 in forwardly spaced relation to and parallel to the mounting plate 65 (FIG. 11). The plate 106 is provided with a large aperture 110, a portion of which registers with the projecting aperture 39 in the wall 38, and through which a roller connecting pin 112 projects from the extension 95 of the feeding lever. The pin 112 is snugly engaged in a transverse slot 113 in a connecting means slide 114 guided for vertical movement upon the face of plate 106 by a plurality of flanged guide rollers 115 engaging vertical edges of the slide. The slide normally rests at a position of rest, as indicated in FIG. 10, in which position a large notch 116 in the upper edge thereof registers with the opening 110 so that the projection aperture is unmasked by the slide 114.

Figure 12:
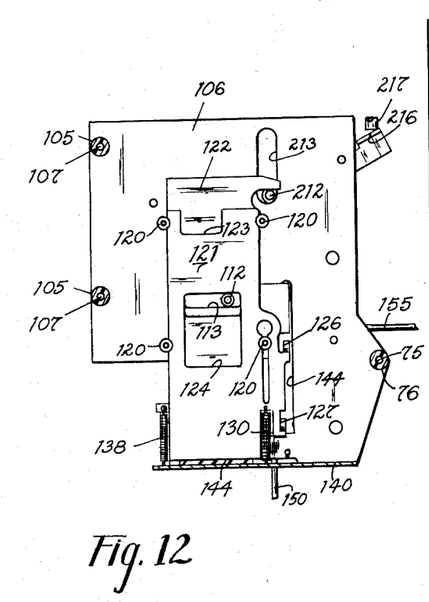
FIG. 12 is a partial vertical section taken substantially along line 12—12 of FIG. 11 and showing the shutter mechanism at its rest position masking the projecting aperture of the projector.

A pair of shutter blades are mounted on the rear surface of the mounting plate 106, being maintained in closely adjacent relation thereto and to each other by a plurality of shutter blade roller guides 120 (FIGS. 12 and 13) which respectively engage vertical edges of the shutters. The shutter blades comprise a rear shutter blade 121 and a forward shutter blade 122. The rear shutter blade has a rectangular notch 123 in its upper edge which normally registers with the projecting aperture and the aperture 110 in plate 106 when the shutter blades are at their rest positions, as illustrated in FIG. 12. The rear shutter blade also has a large central rectangular opening 124 which normally registers with the opening 110. The rear shutter blade has a vertical slot 125 which provides a vertical edge for engagement of one of the guide rollers 120, while permitting an edge of the shutter blade to project beyond the guide roller. This edge is provided with an upper latch operating tab 126 and a lower latch operating tab 127. A spring mounting opening 128 is provided in the shutter blade and the lower edge of the shutter blade is recessed at 129 to provide clearance for a shutter blade returning spring 130.

Figure 13:
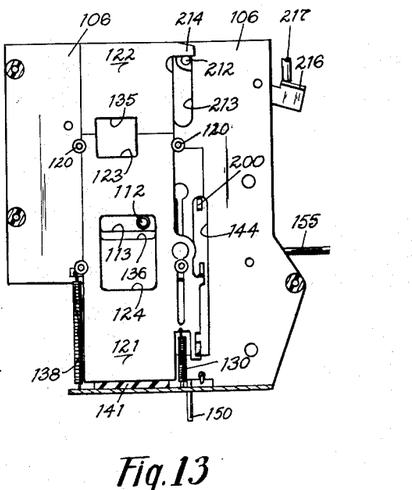
FIG. 13 is a view similar to FIG. 12 showing the shutter mechanism in operation to effect prolonged projection under manual control.
Figures 14, 15:
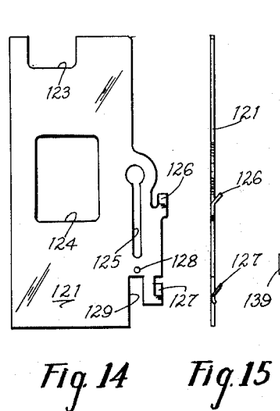
FIG. 14 is a view in elevation of one of the shutter blades of a pair of shutter blades in the shutter mechanism.
FIG. 15 is a side elevation of FIG. 14.
Figure 16:
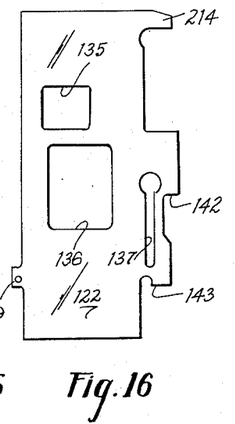
FIG. 16 is a view in elevation of the other shutter blade.

The forward shutter blade 122 is longer than the rear shutter blade and is provided with a projection aperture 135 which is normally masked by a solid portion of the rear shutter blade 121, as seen in FIG. 12. However, the front shutter blade may be raised independently of the rear shutter blade so as to unmask the projection aperture, the image being projected through the opening 135 and the notch 123 when the shutter blades are in this relative position, as shown in FIG. 13. The forward shutter blade is also provided with a large rectangular opening 136 of the same size as opening 124, the openings 124 and 136 being normally in register as seen in FIG. 12. The opening 136 permits independent movement of the front shutter blade without being obstructed by the connection roller pin 112 which projects therethrough. The shutter blade 122 is provided with a vertical slot 137 which provides clearance for one of the roller guide pins 120 and is provided with an apertured tab 139 for engagement of one end of a tension spring 138 which normally holds the front shutter at its position of rest.

The springs 130 and 138 are stretched when the shutter blades are elevated, by means to be described, and rapidly return the shutter blades independently of each other when they are released. The springs are anchored at their lower ends to a horizontal flange 140 on the plate 106, which flange supports a resilient pad 141 in alignment with the lower edges of the shutter blades. The pad 141 takes up the shock of return, prevents rebound of the shutter blades, and prevents clattering thereof. The front shutter blade is recessed at its lateral edge at 142 and 143, thus providing clearance for the projecting tabs 126 and 127 respectively on the rear shutter blade. The tabs project through an elongated vertical slot 144 in the mounting plate 106, for a purpose to be described.

When the roller connecting pin 112 is elevated during a step feeding movement of the disc, the operating slide 114 is elevated by engagement of the pin with the slot 113, and simultaneously and coextensively therewith the two shutter blades are raised by engagement of the roller pin with the upper edges of the apertures 124 and 136. Since the shutter blades move together, the projecting aperture 39 is masked while the shutter blades are at rest as seen in FIG. 12, while both shutter blades are elevated (not shown) and while the shutter blades are moving to their elevated or cocked positions. It is only when the rear shutter blade 121 has been returned to its position of rest and the front shutter blade 122 is in its elevated or cocked position that the projecting aperture 39 is unmasked. It will be realized from the foregoing that upon release of the feeding lever slide 90 the spring 97 effects return of the operating slide 114 so that it unmasks the projecting aperture through its notch 116. During most of the return movement of the operating slide 114 both shutter blades remain at their cocked positions, as will appear.

*Shutter blade latching mechanism*

The mounting structure within the forward portion of the projector housing includes a timer mechanism mounting plate 145 affixed thereto by means of a flange 146 suitably riveted to the plate 106. The plate 145 is positioned vertically and extends forwardly normal to the plate 106. The mounting structure also includes a latch mounting plate 147 which is mounted upon plate 145 and maintained in parallel, spaced relation to plate 145 by suitable bolts, nuts and intervening spacers. The operating slide 114 mounts a cam plate 150 provided with an upwardly projecting cam edge 151 and a downwardly projecting cam edge 152, the cam edge 151 facing the plate 106 and the cam edge 152 facing forwardly away from the plate 106. The cam plate 150 extends substantially parallel to the plates 145 and 147 and is spaced from the plate 147 (FIGS. 10 and 11). The cam edge 151 engages a roller pin 153 on a cocking lever 154 which is loosely journaled on the end of a timer cam shaft 155 (FIG. 17) which is journaled in the plates 145 and 147. A grooved hub 156 fixed to lever 154 and concentrically surrounding the shaft 155 retains the bight of a wishbone spring 157, one arm of which is retained by a pin 158 on an oppositely directed arm of lever 154, and the other arm of which in retained by a tab 159 on a retaining lever 160 pivoted at 161.

Figure 17:
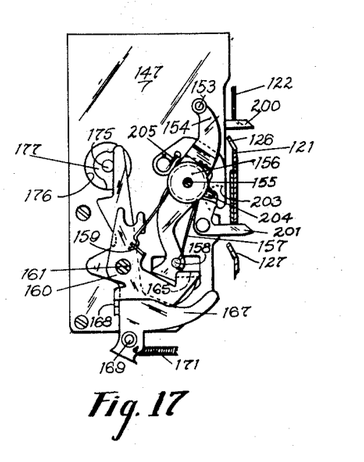
FIG. 17 is a view in elevation taken substantially along line 17—17 of FIG. 10, showing details of the shutter blade controlling mechanism.
Figure 18:
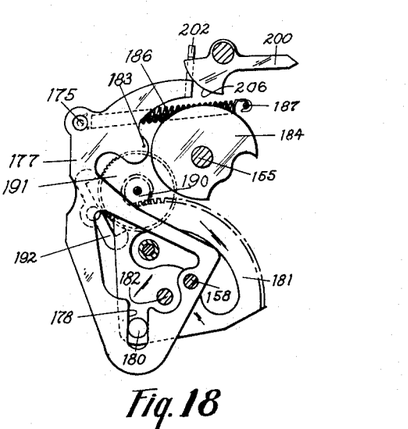
FIG. 18 is a partial vertical elevation on an enlarged scale, taken substantially along line 18—18 of FIG. 10, and showing details of a timer mechanism for varying the length of fractional-second projections.

The retaining lever 160 is provided with a depending flange 165 which hooks over an end of the cocking lever 154 to hold it in the position illustrated in FIG. 17 when the shutter blades are elevated. The retaining lever 160 is also provided with a depending flange 168 which is pressed against an edge of a releasing lever 167 also pivoted at 161 and retained in the position illustrated in FIG. 17 by a spring 171. The opposite end of the releasing lever 167 bears against a pin 175 projecting through an opening 176 in plate 147 from a floating lever 177 (FIGS. 17 and 18). The pin 158 on cocking lever 154 projects through an opening in plate 147 and is fixed to a portion of the floating lever 177. The floating lever 177 is provided with a slot 178 in which is engaged a sector gear driving pin 180 attached to an escapement sector gear 181 pivotally mounted on a pivot 182 fixed to the plate 145.

The arrangement is such that the releasing lever 160 rocks the floating lever counterclockwise when the operating slide is moving upward, thereby through the medium of the pin 180 and slot 178 moving the main sector gear 181 to its cocked position, as illustrated in FIG. 18. As the operating slide moves toward its rest position the releasing lever is moved in such direction that the portion thereof in engagement with the floating lever pin 175 moves toward the right in FIG. 17, thereby permitting the portion of the floating lever adjacent thereto to pivot about the pin 180 and causing a projection 183 thereon to engage the surface of a timer cam 184. As the slide continues to move downwardly the pin 158 is driven toward the right in FIG. 18, thereby causing the floating lever 177 to rock counterclockwise about the projection 183 which is now in engagement with the cam 184. A spring 186 tensioned between the pin 175 and a pin 187 mounted on the plate 147 tends to hold the projection 183 in engagement with the cam 184. However, the hairpin spring 157 is capable of overcoming the spring 186 and drives the sector gear counterclockwise about its pivot 182, thereby causing the floating lever 177 to move counterclockwise about the projection 183. The sector gear 181 is in engagement with a pinion 190 which is fixed to an escapement ratchet 191, the peripheral ratchet teeth of which are engaged by a double-armed, rocking escapement dog 192. The escapement mechanism causes the movement of sector gear 181 under the force of the hairpin spring 157 to be regulated and constant.

The cam edge of the timer cam 184 is so arranged that the length of time required for the projection 183 to engage the cam may be regulated. Such regulation is manually effected through the medium of a timer knob 193 projecting from the side of the casing. The knob 193 is provided with a flange 194 having indicia thereon representing fractions of a second (not shown) which may be set opposite an index point 195 on the surface of the housing. The knob 193 is releasably connected to the timer cam shaft 155 through the medium of a separable driving connection, indicated generally at 196, whereby the housing may be removed (FIG. 10). The connection comprises a crossbar head fitted into a slotted socket on the inner extremity of the knob 193, details of which are not herein illustrated since such devices are well known in the art. By reason of this construction the duration of projection of an image may be accurately varied, for example the projections may endure for one twenty-fifty or one-tenth of a second.

The release of the shutter blades in such controlled manner is effected through the following mechanism: The tabs 126 and 127 on the shutter blade 121 project through the elongated slot 144 and engage blade latches 200 and 201 respectively, which are pivotally mounted on opposite sides of the mounting plate 147, during the cocking movement of the shutter blades. At the termination of the cocking movement the latches 200 and 201 extend substantially normal to the shutter blades, as illustrated in FIG. 17. The upper latch 200 engages only the upper horizontal edge of the notch 142 in blade 122, but the lower latch 201 engages horizontal edges of both blades. When the latches are in this position the upper latch is held in latching engagement by a hook 202 on an end of the floating lever 177, and the lower latch 201 is held in latching engagement by a hook on the end of a catch 203 pivoted on the plate 147. The cocking lever 154 has a cam 204 thereon which engages a projection on the catch 203 so that upon release of the cocking lever the lower latch 201 is substantially immediately released. The catch 203 is normally urged into locking engagement by a spring 205 as illustrated. The cam 204 also serves to move the catch out of the way during cocking movement and then releases the catch to engage the latch at the termination of the cocking movement. The upper latch 200 is provided with a cam surface 206 which normally engages the hook 202 when the latch is released and moves the hook 202 out of the way against the force of spring 186, the spring snapping the hook into engagement with the latch at the termination of the cocking movement.

During the return stroke of the operating slide 114 the release lever 160 is actuated and the cocking lever 154 starts to move counterclockwise as previously described. Immediately upon such movement the cam 204 moves the catch 203 to release the lower latch 201, whereupon the spring 130 returns the shutter blade 121 to its rest position. However, the upper latch 200 continues to hold the second blade 122 in its cocked position, as illustrated in FIG. 13. The projecting aperture 39 is thereby unmasked and an image projected. The escapement mechanism is now set in operation and a fraction of a second later, as determined by the position of the timer cam 184, the upper latch 200 is released and the second blade 122 returns to its rest position as illustrated in FIG. 12.

Manually controlled duration

The mounting plate 106 pivotally supports a lever 210 (FIGS. 10, 12 and 13) at pivot 211. One end of the lever supports a blade engaging pin 212 which projects through a slot 213 in the plate 106 and engages a projection 214 on the shutter blade 122. The pin 212 is normally held at the bottom of slot 213 by a spring 215 stretched between the lever and a pin on plate 145. The opposite end of lever 210 is provided with a flange 216 which engages the lower end of a plunger 217 vertically guided in the casing part 24 and provided with a head 218 which may be engaged by the tip of a finger. When the plunger 217 is depressed, while both shutter blades and the operating slide are at their rest positions, the shutter blade 122 will be raised to unmask the projecting aperture 39 so that an image will be projected as long as the operator desires. Upon releasing the plunger 217 the blade 122 is returned by its spring 138 to again mask the projecting aperture, and plunger 217 is elevated by spring 215 and lever 210.

Partial image projection

A second vertically guided plunger 220 provided with a head 221 is guided in the top of casing part 24, the lower end of the plunger being releasably engaged in a slotted flange at the top of a masking slide 222 slidably guided for vertical movement by tabs 223 struck from the mounting plate 65 (FIGS. 5 and 6). The masking slide is provided with a large aperture 224 which is coextensive in size with the projecting aperture 39, and which may be placed in alignment therewith by manually depressing the plunger 220. An edge of the slide is provided with an upper notch 225 which is so related to the aperture 224 as to hold the aperture in such alignment when engaged by a V-shaped detent tip on a masking slide holding spring 226 mounted on the plate 65. The masking slide is also provided with a narrow horizontal slot 227 of the same width as the projecting aperture, but having substantially less height than the projecting aperture, in the illustrated example being substantially one-third the height thereof. The aperture 227 is defined by a pair of inwardly turned flanges 228 which project toward the plane of the disc 51 through an elongated aperture 229 in the plate 65 (FIG. 11), the flanges sharply defining projection through a portion of a transparency. The edge of the slide is also provided with a plurality of notches 230 so related to the spring 226 that selected portions of a transparency may be projected.

The partial projection of a transparency is of importance in certain training projects, for example in training a student in the art of rapid reading. For example, each transparency may have three lines of indicia thereon, possibly three series of numbers of three series of letters. Therefore, the utility of a single disc of transparencies may be tripled, since there would be fifty-two lines for each disc of fourteen transparencies. In utilizing such a disc, the operator might so place the aperture 227 as to permit projection of an upper line, feed the disc step by step fourteen times, then move the aperture 227 in position to project a central line, and again feed the disc fourteen steps, and so on. It is, of course, obvious that the number of lines may be increased or decreased and the notches 230 positioned accordingly.

The use of the entire aperture 224 may be more desirable for other purposes, such as training artillery observers in aircraft, battleship or tank recognition, in which case the disc could be provided with transparencies having pictures covering the whole transparencies.

Repetition of instantaneous projections

During the training uses as described above, the operator may desire to repeat an image at split second timing a number of times before proceeding to the next transparency. For this purpose means are provided for selectively disengaging the disc feeding arm 102 from feeding engagement with the disc. Such means include a disengaging lever 235 pivotally mounted on the wall 39 at pivot 240. The lever 235 projects outwardly through the slot 93 (FIG. 1) and is provided with a manually engageable knob 236 which lies directly below the slide 90, so that it may be engaged and elevated by the fingers of the same hand which engages the slide thumb piece 92. When the lever 235 is so elevated a cam surface 237 thereon is moved into the path of a raised corner 238 on the end of the feeding arm 102 adjacent the feeding claw 103. The feeding claw is thereby elevated so that it cannot engage the apertures 60 in the disc 51 (FIGS. 7 and 9). Therefore, depression of the slide 90 results in cocking movement and return of the shutter blades as described above, without advancing the disc.

Having illustrated and described a preferred embodiment of the invention, it should be apparent to those skilled in the art that the same permits of modifications in arrangement and detail. All such modifications as come within the true spirit and scope of the following claims are considered to be a part of my invention.

I claim:

1. In a tachistoscope comprising a projector including means to receive and rotatably guide a disc holding a concentric row of transparencies, disc feeding means movable from a rest position to an advanced position for rotating said disc one step during each such movement thereof whereby successively to place said transparencies at a projecting aperture, and means to return said feeding means to its rest position; a pair of shutters, a mounting structure in said projector including means for maintaining said shutters in planes parallel to and adjacent said disc, said shutters being normally at rest positions and being movable therefrom to cocked positions, connecting means operatively connecting said feeding means and said shutters during each disc advancing movement of said feeding means for advancing said shutters simultaneously to their cocked positions at each step movement of the disc, a pair of shutter latching means mounted on said mounting structure and including a pair of latches respectively engageable with said shutters to hold them at their cocked positions, means operatively connecting said feeding means to said latching means during advancing movement of said feeding means for effecting latched engagement of said latches with said shutters at their cocked positions, said shutters masking said projecting aperture while at their rest positions, while moving to their cocked positions and while at their cocked positions, other connecting means operatively connecting said feeding means and one of said latching means during return movement of said feeding means to its rest position for effecting release of one of said latches from latching engagement with one of said shutters, a pair of resilient means respectively biased between said shutters and said mounting structure and individually operative to return said shutters to their rest positions when released by said latching means, and timing mechanism operatively associated with said pair of latching means for effecting release of the other of said latches from its shutter at a time interval after release of said one shutter, said projecting aperture being unmasked after said one shutter has returned to its rest position and while said other shutter remains at its cocked position.

2. In a tachistoscope comprising a projector including means to receive and rotatably guide a disc holding a concentric row of transparencies, disc feeding means normally remaining at a rest position and movable to an advanced position for rotating said disc one step during each such movement thereof whereby successively to place said transparencies at a projecting aperture, and means to return said feeding means to its rest position; a pair of shutter blades, a mounting structure in said projector including guiding means for maintaining said blades in planes parallel to and adjacent said disc, said blades being normally at rest positions and being movable therefrom to cocked positions, connecting means operatively connecting said feeding means and said blades during each disc advancing movement of said feeding means for advancing said blades simultaneously to their cocked positions at each step movement of the disc, a pair of blade latching means mounted on said mounting structure and including a pair of latches respectively engageable with said blades to hold them at their cocked positions, means operatively connecting said feeding means to said latching means during advancing movement of said feeding means for effecting latched engagement of said latches with said blades at their cocked positions, said blades masking said projecting aperture while at their rest positions, while moving to their cocked positions and while at their cocked positions, other connecting means operatively connecting said feeding means and one of said latching means during return movement of said feeding means to its rest position for effecting release of one of said latches from latching engagement with one of said blades, a pair of resilient means respectively biased between said blades and said mounting structure and individually operative to return said blades to their rest positions when released by said latching means, and timing mechanism operatively associated with said pair of latching means for effecting release of the other of said latches from its blade at a time interval after release of said one blade, said projecting aperture being unmasked after said one blade has returned to its rest position and while said other blade remains at its cocked position.

3. In a tachistoscope comprising a projector including means to receive and rotatably guide a disc holding a concentric row of transparencies, disc feeding means movable from a rest position to an advanced position for rotating said disc one step at each advancing movement thereof whereby successively to place said transparencies at a projecting aperture, means to advance said feeding means, and means to return said feeding means to its rest position; a pair of shutter blades, a mounting structure in said projector including guiding means for maintaining said blades in planes parallel to and adjacent said disc, said blades being normally at rest positions and being movable therefrom to cocked positions, connecting means operatively connecting said feeding means and said blades during each disc advancing movement of said feeding means for advancing said blades simultaneously to their cocked positions at each step movement of the disc, a pair of blade latching means mounted on said mounting structure and including a pair of latches respectively engageable with said blades to hold them at their cocked positions, means operatively connecting said feeding means to said latching means during advancing movement of said feeding means for effecting latched engagement of said latches with said blades at their cocked positions, said blades masking said projecting aperture while at their rest positions, while moving to their cocked positions and while at their cocked positions, other connecting means operatively connecting said feeding means and one of said latching means during return movement of said feeding means to its rest position for effecting release of one of said latches from latching engagement with one of said blades, a pair of resilient means respectively biased between said blades and said mounting structure and individually operative to return said blades to their rest positions when released by said latching means, and timing mechanism operatively associated with said pair of latching means for effecting release of the other of said latches from its blade at a time interval after release of said one blade, said projecting aperture being unmasked after said one blade has returned to its rest position and while said other blade remains at its cocked position, said timing mechanism comprising means selectively to vary said time interval.

4. In a tachistoscope comprising a projector including means to receive and rotatably guide a disc holding a concentric row of transparencies, disc feeding means movable from a rest position to an advanced position for rotating said disc one step at each advancing movement thereof whereby successively to place said transparencies at a projecting aperture, and means to advance and return said feeding means; a pair of shutter blades, a mounting structure in said projector including guiding means for maintaining said blades in planes parallel to and adjacent said disc, said blades being normally at rest positions and being movable therefrom to cocked positions, connecting means operatively connecting said feeding means and said blades during each advancing movement of said feeding means for advancing said blades simultaneously to their cocked positions at each step movement of the disc, a pair of blade latching means mounted on said mounting structure and including a pair of latches respectively engageable with said blades to hold them at their cocked positions, means operatively connecting said feeding means to said latching means during advancing movement of said feeding means for effecting latched engagement of said latches with said blades at their cocked positions, said blades masking said projecting aperture while at their rest positions, while moving to their cocked positions and while at their cocked positions, other connecting means operatively connecting said feeding means and one of said latching means during return movement of said feeding means to its rest position for effecting release of one of said latches from latching engagement with one of said blades, a pair of resilient means respectively biased between said blades and said mounting structure and individually operative to return said blades to their rest positions when released by said latching means, timing mechanism operatively associated with said pair of latching means for effecting release of the other of said latches from its blade at a time interval after release of said one blade, said projecting aperture being unmasked after said one blade has returned to its rest position and while said other blade remains at its cocked position, and manual means individually to advance said other blade to its cocked position whereby to unmask said projecting aperture without advancing the disc or effecting operation of said latching means.

5. In a tachistoscope comprising a projector including means to receive and rotatably guide a disc holding a concentric row of transparencies, disc feeding means movable from a rest position to an advanced position for rotating said disc one step at each advancing movement thereof whereby successively to place said transparencies at a projecting aperture, and means to advance and return said feeding means; a pair of shutter blades, a mounting structure in said projector including guiding means for maintaining said blades in planes parallel to and adjacent said discs, said blades being normally at rest positions and being movable therefrom to cocked positions, connecting means operatively connecting said feeding means and said blades during each advancing movement of said feeding means for advancing said blades simultaneously to their cocked positions at each step movement of the disc, a pair of blade latching means mounted on said mounting structure and including a pair of latches respectively engageable with said blades to hold them at their cocked positions, means operatively connecting said feeding means to said latching means during advancing movement of said feeding means for effecting latched engagement of said latches with said blades at their cocked positions, said blades masking said projecting aperture while at their rest positions, while moving to their cocked positions and while at their cocked positions, other connecting means operatively connecting said feeding means and one of said latching means during return movement of said feeding means to its rest position for effecting release of one of said latches from latching engagement with one of said blades, a pair of resilient means respectively biased between said blades and said mounting structure and individually operative to return said blades to their rest positions when released by said latching means, timing mechanism operatively associated with said pair of latching means for effecting release of the other of said latches from its blade at a time interval after release of said one blade, said projecting aperture being unmasked after said one blade has returned to its rest position and while said other blade remains at its cocked position, said feeding means comprising a member normally in feeding engagement with said disc, and means for selectively disengaging said member from said disc in order to repeat the projection of a selected image.

6. In a tachistoscope comprising a projector including means to receive and rotatably guide a disc holding a concentric row of transparencies, disc feeding means movable from a rest position to an advanced position for rotating said disc one step at each advancing movement thereof whereby successively to place said transparencies at a projecting aperture, and means to advance and return said feeding means; a pair of shutter blades, a mounting structure in said projector including guiding means for maintaining said blades in planes parallel to and adjacent said disc, said blades being normally at rest positions and being movable therefrom to cocked positions, connecting means operatively connecting said feeding means and said blades during each advancing movement of said feeding means for advancing said blades simultaneously to their cocked positions at each step movement of the disc, a pair of blade latching means mounted on said mounting structure and including a pair of latches respectively engageable with said blades to hold them at their cocked positions, means operatively connecting said feeding means to said latching means during advancing movement of said feeding means for effecting latched engagement of said latches with said blades at their cocked positions, said blades masking said projecting aperture while at their rest positions, while moving to their cocked positions and while at their cocked positions, other connecting means operatively connecting said feeding means and one of said latching means during return movement of said feeding means to its rest position for effecting release of one of said latches from latching engagement with one of said blades, a pair of resilient means respectively biased between said blades and said mounting structure and individually operative to return said blades to their rest positions when released by said latching means, timing mechanism operatively associated with said pair of latching means for effecting release of the other of said latches from its blade at a time interval after release of said one blade, said projecting aperture being unmasked after said one blade has returned to its rest position and while said other blade remains at its cocked position, said feeding means comprising a member normally in feeding engagement with said disc, means for selectively disengaging said member from said disc in order to repeat the projection of a selected image, said feeding means comprising a first manually engageable lever movable along a path, and said disengaging means comprising a second manually engageable lever movable along a continuation of said path, said levers being simultaneously engageable by the digits of one hand.

7. In a tachistoscope comprising a projector including means to receive and rotatably guide a disc holding a concentric row of transparencies, disc feeding means normally remaining at a rest position and movable to an advanced position for rotating said disc one step during each such movement thereof whereby successively to place said transparencies at a projecting aperture, and means to return said feeding means to its rest position; a pair of shutter blades, a mounting structure in said projector including guiding means for maintaining said blades in planes parallel to and adjacent said disc, said blades being normally at rest positions and being movable therefrom to cocked positions, connecting means operatively connecting said feeding means and said blades during each disc advancing movement of said feeding means for advancing said blades simultaneously to their cocked positions at each step movement of the disc, a pair of blade latching means mounted on said mounting structure and including a pair of latches respectively engageable with said blades to hold them at their cocked positions, means operatively connecting said feeding means to said latching means during advancing movement of said feeding means for effecting latched engagement of said latches with said blades at their cocked positions, said blades masking said projecting aperture while at their rest positions, while moving to their cocked positions and while at their cocked positions, other connecting means operatively connecting said feeding means and one of said latching means during return movement of said feeding means to its rest position for effecting release of one of said latches from latching engagement with one of said blades, a pair of resilient means respectively biased between said blades and said mounting structure and individually operative to return said blades to their rest positions when released by said latching means, timing mechanism operatively associated with said pair of latching means for effecting release of the other of said latches from its blade at a time interval after release of said one blade, said projecting aperture being unmasked after said one blade has returned to its rest position and while said other blade remains at its cocked position, a masking slide mounted on said mounting structure for movement past said projecting aperture, said slide having a slot therein of lesser width than a transparency, and means selectively to retain said slide at a plurality of positions with said slot in projecting alignment with selected portions of said projecting aperture.

No references cited.